United States Patent [19]

Day et al.

[11] Patent Number: 5,281,462
[45] Date of Patent: Jan. 25, 1994

[54] MATERIAL, STRUCTURE, FILTER AND CATALYTIC CONVERTER

[75] Inventors: John P. Day, Big Flats; Timothy V. Johnson, Corning, both of N.Y.

[73] Assignee: Corning Incorporated, Corning, N.Y.

[21] Appl. No.: 430,719

[22] Filed: Nov. 1, 1989

[51] Int. Cl.$^5$ .............................................. B32B 3/12
[52] U.S. Cl. ................................. 428/116; 210/510.1; 501/4; 501/5; 501/128; 502/527
[58] Field of Search ............... 428/116; 210/510.1; 501/4, 5, 128; 502/527

[56] References Cited

U.S. PATENT DOCUMENTS

| | | | |
|---|---|---|---|
| Re. 33,077 | 10/1989 | VanDewoestine | 422/177 X |
| 3,112,184 | 11/1963 | Hollenbach | 428/116 X |
| 3,444,925 | 5/1969 | Johnson | 428/116 X |
| 3,790,654 | 2/1974 | Bagley | 428/116 X |
| 3,824,196 | 7/1974 | Benbow et al. | 428/116 X |
| 4,258,099 | 3/1981 | Narumiya | 501/80 X |
| 4,560,478 | 12/1985 | Narumiya | 210/510.1 X |
| 4,591,383 | 5/1986 | McGarry et al. | 428/116 X |
| 4,681,624 | 7/1987 | DeAngelis et al. | 210/767 X |
| 4,772,395 | 9/1988 | Tungatt et al. | 210/510.1 X |
| 4,885,263 | 12/1989 | Brockmeyer et al. | 210/510.1 X |
| 5,022,991 | 6/1991 | Day et al. | 428/116 X |
| 5,079,064 | 1/1992 | Forsythe | 428/116 X |

*Primary Examiner*—Henry F. Epstein
*Attorney, Agent, or Firm*—Richard N. Wardell

[57] ABSTRACT

Porous sintered ceramic material having bulk analytical composition, by weight, of 74-79% alumina and the balance being silica optionally with other oxide and/or impurities naturally occurring from the batch materials, and having a phase composition, by weight, of 50-75% mullite, 23-45% corundum, 0-6% cristobalite and the balance being substantially 2-10% amorphous alumina-silica based phase. Honeycomb structure, molten metal filter and catalytic converter made from the material.

18 Claims, No Drawings

MATERIAL, STRUCTURE, FILTER AND CATALYTIC CONVERTER

BACKGROUND OF THE INVENTION

The invention relates to a porous sintered ceramic material based primarily on having crystalline phases of mullite and corundum (alpha alumina) interspersed with an amorphous alumina-silica based phase in proportions that provide a combination of improved strength, creep resistance and dimensional stability at high temperatures of use together with good thermal shock resistance. In a particularly beneficial form of the invention, a honeycomb or cellular monolith structure is made of the material to serve many useful purposes. Especially notable are molten metal filters (e.g. for filtering molten steel and gray iron) and catalytic converters or combustors (e.g. for reducing incompletely combusted emissions from solid fuel burning devices) constructed of such honeycomb structures.

Several porous sintered mullite-corundum ceramic materials have been heretofore proposed and used for a variety of purposes.

U.S. Pat. No. 4,560,478 discloses a porous alumina-based ceramic material with a bulk analytical content of 70-92% by weight of alumina and contains 1-95% by weight of needle-like crystals which apparently are mullite crystals. This material is in the form of a three-dimensional network of strands defining interconnected cells, which is a replica of the polyurethane foam with which it is formed. Dispersed in the network is a nitride, carbide, boride or silicide of metal to provide the resultant body with thermal shock resistance. Such bodies are said to be useful as molten metal filters, traps for particulates in exhaust gases, other filters and catalyst carriers.

Three molten metal filters of porous sintered ceramic honeycomb structure recently found in the commercial marketplace were determined to have the following compositions (% by weight):

|  | Product | | |
| --- | --- | --- | --- |
|  | A | B | C |
| Bulk analysis |  |  |  |
| Alumina | 69.2 | 49.2 | 68 |
| Silica | 28.9 | 48.8 | 28 |
| Phase analysis |  |  |  |
| Mullite | 20 | 66 | 19 |
| Corundum | 48 | — | 49 |
| Cristobalite | 9.2 | — | 8 |
| Quartz (estimated) | 3-8* | — | 4-9* |
| Amorphous alumina-silica based phase | 15-20* | 34 | 15-20* |

(*estimated)

A woodstove catalytic combustor of porous sintered mullite-type ceramic in the form of a honeycomb structure, which has been commercially available, has 72% by weight alumina in its bulk analysis and has a phase analysis, by weight, of about 61% mullite, 26% corundum, 9% cristobalite, and 4% amorphous.

However, our research lead us to the discovery of a porous sintered ceramic material that has the aforementioned combination of improved properties which is not possessed or provided by any of the prior art porous sintered mullite-alumina materials known to us.

SUMMARY OF THE INVENTION

The porous ceramic material of the invention has a bulk analytical composition, by weight, of 74-79% alumina and the balance being silica optionally with other oxide and/or impurities naturally occurring from the batch materials, and has a phase composition, by weight, of 45-75% mullite, 23-45% corundum, 0-8% cristobalite and the balance being substantially 2-10% amorphous alumina-silica based phase. Generally the other oxide and/or impurities do not exceed 3% by weight. The mullite crystalline phase contains a non-stoichiometric excess of alumina in solid solution that provides that phase with a higher melting temperature than stoichiometric mullite. The other oxide may be any oxide, e.g. magnesia, that forms a solid solution with alumina in the corundum crystalline phase. The impurities are substantially contained in the amorphous phase, which is usually about one-third alumina and about two-thirds silica, although such amorphous phase may vary from about 0% to 40% $Al_2O_3$. The material generally of blocky and platy crystals interspersed with the amorphous or glassy phase, but is substantially or virtually free of needle-like crystals, including those of mullite. This balanced composition of the material provides the combination of improved properties as described above and as will hereinafter be illustrated.

A particularly beneficial form of the invention is a honeycomb structure with interconnected thin walls of the porous sintered material of the invention defining open—ended cells. Such structure can have cell cross-sectional shapes, cell densities per unit of cross-sectional area of the structure, and wall thicknesses as are generally known in the technology of ceramic honeycomb or cellular monolith structures.

Especially desirable embodiments of these structures of the invention are molten metal filters and catalytic converters or combustors for solid fuel burning devices. For molten metal filters, the structures desirably have a cell density of about 9–400 cells per square inch, a wall thickness of 0.010–0.050 (preferably 0.012–0.035) inch and a cell flow length of 0.25–1.0 (preferably 0.4–0.8) inch. The wall thickness of an uncoated filter is very important in molten steel pours to being able to survive within about 20 seconds or so, of pours lasting up to 3 minutes or so, of slag corrosion attack. Generally, uncoated wall thickness of 0.018 inch or more will survive molten steel pours. However, somewhat thinner walls can be used when the filter has a coating to better withstand such slag attack, such as the thermite coating disclosed in our copending U.S. patent application Ser. No. 07/241,581, now U.S. Pat. No. 5,022,991. Such molten metal filters can be employed in known arrangements such as those illustrated in U.S. Pat. Nos. 4,591,383 and 4,681,624. For catalytic combustors for solid fuel burning devices, the structures are provided with a catalyst thereon, preferably of the combination of alumina washcoat and precious metal catalyst as described in U.S. Pat. Re. No. 33,077, and they desirably have a cell density of less than 200 (preferably 9-25) cells per square inch, a wall thickness of 0.010–0.050 (preferably 0.015–0.025) inch and a cell flow length appropriate to the volume and cell density of the combustor as is known in accordance with U.S. Pat. Re. No. 33,077.

In filtering molten steel, it is advantageous that the porous sintered material of the honeycomb structure have the bulk analytical composition, by weight, having 76-79% alumina, and a phase composition, by weight, of 60-70% mullite, 23-33% corundum, 0-2% cristobalite and the balance being 5-10% amorphous alumina-silica based phase. In these cases, desired cell densities are 9-100 cells per square inch and desired uncoated wall thicknesses are 0.018-0.035 inch.

For filtering molten gray iron, the same structures as noted above for steel filtering can be used, but it has been found economically desirable that the porous sintered material of the honeycomb structure have a phase composition, by weight, of 40-65% mullite, 30-45% corundum, 0-8% cristobalite and the balance being 5-10% amorphous alumina-silica based phase.

DETAILED DESCRIPTION

Products of the invention generally can be prepared from any suitable mixture of alumina and alumino-silicate minerals, e.g. clays, kyanite, sillimanite, etc. Clays are preferred for extruding honeycomb structures, among which kaolinite, halloysite, montmorillonite, illite, allophane and chlorite can be used. Kaolinitic clays are most preferred.

The ceramic batch material mixtures are shaped into desired forms by any appropriate ceramic forming process, which can be by any form of plastic mixture pressing or slurry casting technique. For example, honeycomb or cellular monolith structures can be extruded as known from U.S. Pat. Nos. 3,790,654 and 3,824,196, or they can be fabricated by bonding sheets as known from U.S. Pat. Nos. 3,112,184 and 3,444,925. Extrusion is an economically preferred process.

For plastically shaping the batch material mixtures, they are typically mixed with temporary organic binders and plasticizers and with a plasticizing liquid, e.g. water, all as conventionally practiced in ceramic technology.

After shaping the batch material mixtures into green bodies or structures, the latter are conventionally dried and then fired by a suitable schedule to sintering temperature of about 1375°-1425° C. to develop the required phase composition in the porous sintered ceramic material. It is necessary not to fire at too high temperature because it will cause further reaction that depletes the amorphous phase and increases the mullite phase to the detriment of loss of a significant amount of thermal shock resistance.

A series of porous sintered ceramic materials were made in the forms of extruded rods ⅜ inch diameter and about 5 inch long as fired and extruded honeycomb structures with cell density of 100 cells per square inch and wall thickness of about 0.020-0.022 inch as fired. They were formed of mixtures of the ceramic batch materials set forth in Table 1.

TABLE 1

| Material | Particle Size Distribution | | |
|---|---|---|---|
| | 10% finer than | 50% finer than | 90% finer than |
| Hydrite PX raw kaolin clay | 0.5 μm | 1.8 μm | 6.3 μm |
| Glomax LL calcined kaolin clay | 0.98 μm | 3.5 μm | 9.7 μm |
| Alcan C-701 alumina | 2.5 μm | 6.3 μm | 15.8 μm |

These ceramic batch materials were mixed in a series proportions Yielding nominal bulk alumina analyses, all in weight percent, as set forth in Table 2 and with the addition, by weight, of 4% of Dow A4M Methocel ® methyl cellulose as binder-plasticizer, 1% of sodium stearate as extrusion aid and 26-27% water. The samples marked with an asterisk are not within the invention.

TABLE 2

| Sample | Nominal Bulk Alumina | Chemical Analyses | | |
|---|---|---|---|---|
| | | Hydrite PX | Glomax LL | Alcan C-701 |
| 1* | 72 | 23.93 | 29.82 | 46.26 |
| 2* | 73 | 22.98 | 28.64 | 48.38 |
| 3 | 74 | 22.16 | 27.61 | 50.23 |
| 4 | 75 | 21.33 | 26.58 | 52.09 |
| 5 | 76 | 20.51 | 25.55 | 53.94 |
| 6 | 77 | 19.67 | 24.50 | 55.83 |
| 7 | 78 | 18.84 | 23.47 | 57.69 |
| 8* | 80 | 17.15 | 21.38 | 61.47 |
| 9* | 82 | 15.46 | 19.17 | 65.37 |
| 10* | 84 | 13.76 | 17.07 | 69.17 |
| 11* | 86 | 12.06 | 14.98 | 72.96 |
| 12* | 90 | 8.66 | 10.72 | 80.62 |

After extruding the rods and structures from these batch mixtures, the resulting greenware were fired generally at a rate of 40° C./hour up to 1390° C., then held at a sintering temperature of 1390°-1410° C. for 8 hours and cooled to about room temperature within 20 hours.

Table 3 sets forth the phase analyses in weight percent of the rods. Again, the samples marked with an asterisk are not within the invention.

TABLE 3

| Sample | Nominal Bulk Alumina | X-ray Diffraction Analyses | | | |
|---|---|---|---|---|---|
| | | Mullite | Corundum | Cristobalite | Amorphous |
| 1* | 72 | 68.0 | 19.0 | 7.9 | 5.1 |
| 2* | 73 | 65.4 | 22.0 | 6.3 | 6.3 |
| 3 | 74 | 65.7 | 23.0 | 4.1 | 7.2 |
| 5 | 76 | 67.0 | 24.0 | 0.36 | 8.6 |
| 6 | 77 | 62.8 | 28.0 | 0 | 9.2 |
| 7 | 78 | 62.1 | 29.0 | 0 | 8.9 |
| 8* | 80 | 59.2 | 33.0 | 0 | 7.8 |
| 9* | 82 | 53.5 | 40.0 | 0 | 6.5 |
| 11* | 86 | 42.8 | 52.0 | 0 | 5.2 |

Table 4 sets forth the physical properties of the rods of the same samples, some of which were also fired at 1650° C. Samples 3-7 fired at 1650° C. are not of this invention due to depletion of the amorphous phase, but serve to illustrate dimensional stability of those samples of the invention fired at nominally 1400° C. The average sag values are in mil units, one of which is 0.001 inch, and were determined by the following test: (a) the rods are placed on two supports and span the 3.75 inches of space between those supports, (b) the assembly of rods and supports are set in a kiln heated to 1650° C. and held in the kiln at 1650° C. for 1 hour, and (c) after cooling to room temperature, the sag of the bars between the supports is measured. Firing shrinkage is reported in linear percent. Modulus of rupture (MOR) or flexure strength is reported in psi units. Coefficient of thermal expansion (CTE) is reported in units of ×10$^{-7}$/° C. over the temperature range of 25° to 900° C. Hg porosity is reported in volume percent.

TABLE 4

| Sample | Nominal Bulk Alumina | 1400° C. Firing | | | | | 1650° C. Fire | |
|---|---|---|---|---|---|---|---|---|
| | | Avg Sag | Firing Shrink | MOR | CTE | Hg Por. | Avg Sag | Firing Shrink |
| 1* | 72 | 67 | 5.7 | 11100 | 58.8 | 39.5 | 21 | 8.0 |
| 2* | 73 | 62 | 5.4 | | | | | |
| 3 | 74 | 65 | 4.7 | 9720 | 56.8 | 40.9 | 15 | 6.0 |
| 4 | 75 | 54 | 4.8 | | | | | |
| 5 | 76 | 63 | 4.1 | 8560 | 58.8 | 42.6 | | |
| 6 | 77 | 57 | 4.2 | | | | | |
| 7 | 78 | 62 | 4.8 | | 59.1 | 43.3 | 14 | 3.9 |
| 8* | 80 | 62 | | 7000 | | | 21 | 3.2 |
| 9* | 82 | 72 | 2.7 | 6190 | 62.9 | | | 3.8 |
| 10* | 84 | 85 | 2.1 | | | | 31 | 4.0 |
| 11* | 86 | 91 | 2.0 | | 66.1 | | 47 | 3.2 |
| 12* | 90 | 153 | 1.7 | | | | 35 | 7.5 |

The data in Table 4 show that samples of the invention, in contrast to the samples not of the invention, possess extraordinarily and surprisingly improved high temperature sag or creep resistance along with improved flexure strength. The more closely similar firing shrinkages at both firing temperatures for Samples 3-7, in comparison with those more differing shrinkages for the other samples, indicate that the material of this invention (i.e. fired at nominally 1400° C.) will not undergo detrimental shrinkage in service at higher temperatures, such as up to 1650° C. in filtering molten steel for up to 3 minutes or so. Thus, material of the invention can be fired at the lower temperature to provide adequate amorphous phase along with the other compositional requirements of the invention to provide such material with good thermal shock resistance, and despite any further reaction in that material after withstanding the thermal shock of the higher service temperature, it will not significantly shrink further. The latter beneficial effect insures against, for example, a molten steel or gray iron filter shrinking loose from its mechanically held or cemented position during filtering and thereby causing failure in the filtering function. Moreover, since the microstructural mechanisms of firing shrinkage are the same as those causing high temperature creep, such high temperature dimensional stability is also indicative of high resistance to creep at high temperature. The improved lower CTE values for Samples 3-7 also indicate a higher level of resistance to thermal shock of the present invention.

Table 5 sets forth data of physical properties and molten steel filtering test results on honeycomb structures of the noted samples. Values of total shrinkage, MOR and CTE are in the same units as for those in Table 4. These honeycomb samples were Blanchard ground before their MOR was measured using the known ring-on-ring test. The filter test results are from tests using a runner system that employs a 16 inch ferrostatic head, a 3.2 inch unsupported span of filter between mounting locations, a 0.5 inch cell flow length in the filter in horizontal orientation, and a filtering flow of 200 pounds of molten steel.

TABLE 5

| Sample | Nominal Bulk Alumina | Total Shrink | MOR | CTE | Filter Test Results |
|---|---|---|---|---|---|
| 1* | 72 | 7.6 | 1990 | 61.2 | Softening failure at >1621° C. |
| 4 | 75 | 5.1 | 1810 | 60.7 | Not tested |
| 5 | 76 | 4.8 | 1750 | 57.9 | Repeatable success at 1657° C.; single success up to 1663° C. |
| 6 | 77 | 4.7 | 1732 | 59.7 | Repeatable success at 1657° C.; single success up to 1663° C. |
| 8* | 80 | 4.4 | 1390 | 61.2 | Softening failure at 1640° C. |

An extruded honeycomb structure of sample 6, with a cell density of 300 cells per square inch and wall thickness of 0.012-0.014 inch, was also fired at a rate of 90° C./hour up to and held at 1385°-1395° C. for 4 hours, and then it was cooled to room temperature. The resulting phase analysis, by weight, of this structure was 54% mullite, 35% corundum, 4% cristobalite and 7% amorphous phase. It was successfully tested repeatedly in filtering molten gray iron at 1540° C.

We claim:

1. A porous sintered ceramic material
   (a) shaped from a mixture having a bulk analytical composition, by weight, consisting essentially of 74-79% alumina and the balance being silica with, if any, a member selected from the group consisting of other oxides, impurities naturally occurring from materials forming the mixture, and mixtures thereof, and
   (b) having a sintered phase composition, by weight, of 45-75% mullite, 23-45% corundum, 0-8% cristobalite and the balance being substantially 2-10% amorphous alumina-silica based phase.

2. The material of claim 1 wherein the bulk analytical composition includes a member selected from the group consisting of other oxides, impurities naturally occurring from materials forming the mixture, and mixtures thereof, and the member does not exceed about 3% by weight.

3. The material of claim 1 wherein the bulk analytical composition, by weight, has 76-79% alumina, and the sintered phase composition, by weight, is 60-70% mullite, 23-33% corundum, 0-2% cristobalite and the balance being 5-10% amorphous alumina-silica based phase.

4. The material of claim 1 wherein the sintered phase composition, by weight, is 45-65% mullite, 30-45% corundum, 0-8% cristobalite and the balance being 5-10% amorphous alumina-silica based phase.

5. The material of claim 1 wherein the bulk analytical composition includes at least one of the other oxides and the corundum includes at least one of the other oxides in solid solution with alumina therein.

6. The material of claim 1 wherein the bulk analytical composition includes the impurities and the amorphous alumina-silica based phase substantially contains the impurities.

7. The material of claim 1 which is substantially free of needle-like crystals.

8. A honeycomb structure with interconnected thin walls of the porous sintered ceramic material of claim 1 defining open-ended cells.

9. The structure of claim 8 wherein the bulk analytical composition includes a member selected from the group consisting of other oxides, impurities, and mixtures thereof, and the member does not exceed about 3% by weight.

10. The structure of claim 8 wherein the bulk analytical composition, by weight, has 76-79% alumina, and the sintered phase composition, by weight, is 60-70% mullite, 23-33% corundum, 0-2% cristobalite and the balance being 5-10% amorphous alumina-silica based phase.

11. A filter for filtering molten metal which comprises the honeycomb structure of claim 10.

12. The structure of claim 8 wherein the sintered phase composition, by weight, is 45-65% mullite, 30-45% corundum, 0-8% cristobalite and the balance being 5-10% amorphous alumina-silica based phase.

13. A filter for filtering molten metal which comprises the honeycomb structure of claim 12.

14. The structure of claim 8 wherein the bulk analytical composition includes at least one of the other oxides and the corundum includes at least one of the other oxides in solid solution with alumina therein.

15. The structure of claim 8 wherein the bulk analytical composition includes the impurities and the amorphous alumina-silica based phase substantially contains the impurities.

16. The structure of claim 8 which is substantially free of needle-like crystals.

17. A filter for filtering molten metal which comprises the honeycomb structure of claim 8.

18. A catalytic converter for a solid fuel burning device, the converter comprising the honeycomb structure of claim 8.

* * * * *